Figure 1:
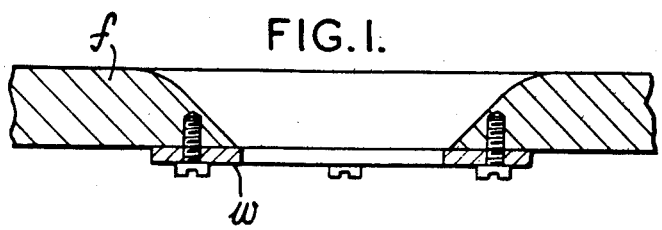

Oct. 28, 1952  P. G. A. H. VOIGT  2,615,996
MAGNET POLE STRUCTURE
Filed March 4, 1948

INVENTOR
Paul G. A. H. Voigt
By Harry Sangsam
ATTORNEY

Patented Oct. 28, 1952

2,615,996

UNITED STATES PATENT OFFICE 2,615,996

MAGNET POLE STRUCTURE

Paul Gustavus Adolphus Helmuth Voigt, London, England

Application March 4, 1948, Serial No. 12,914
In Great Britain March 4, 1947

2 Claims. (Cl. 179—119)

This invention relates to constructional details of the front plate outer pole portion of magnet structures of the type used for moving coil loudspeakers, but it is not restricted to magnets for loudspeakers since it is applicable generally to magnets of that type, i. e. those providing an annular gap.

It is only applicable, if for any reason the outer pole piece is made separately from the front plate or whatever takes the place of the front plate in the general magnet structure.

A standardized front plate can be used with pole pieces of different sizes, or of special materials if the pole pieces are made separately. These are but two of the reasons why such construction is sometimes desirable.

According to this invention, I make the outer pole-piece in the general shape of a washer having a flat surface in contact with one side (preferably the inner side) of the front plate (or that part of the magnetic structure acting as front plate) the pole-piece and front plate having axially aligned holes, and the magnetic joint between the pole-piece and the front plate being formed by the mutually contacting flat surfaces of the pole-piece and front plate.

Such a joint between two flat surfaces is a cheap and straightforward job demanding little skill and not involving close tolerances when compared with the normal method of machining the pole piece very accurately and fitting it into a recess or bore machined with corresponding accuracy in the front plate.

Since the washer can be much wider radially than the gap length, i. e. washer thickness, the flux density across the joint will be relatively low, thus helping to keep joint losses negligible.

The flat side of the washer away from the front plate carries flux at high density only close to the gap, the outer corner serves no useful purpose and has the disadvantage of increasing leakage. I prefer therefore to chamfer that side of the washer outwards.

By positioning the pole piece on the surface of the front plate, the position of the gap is altered and the inner pole may have to be shortened, or the front plate be set further forward, arrangements which like the chamfering of the washer above have certain advantages as described in my co-pending application Serial No. 12,913, of even date herewith.

In order that this invention may be properly understood, I shall now describe by way of example, and with the aid of the accompanying drawings three embodiments thereof.

Figure 2:
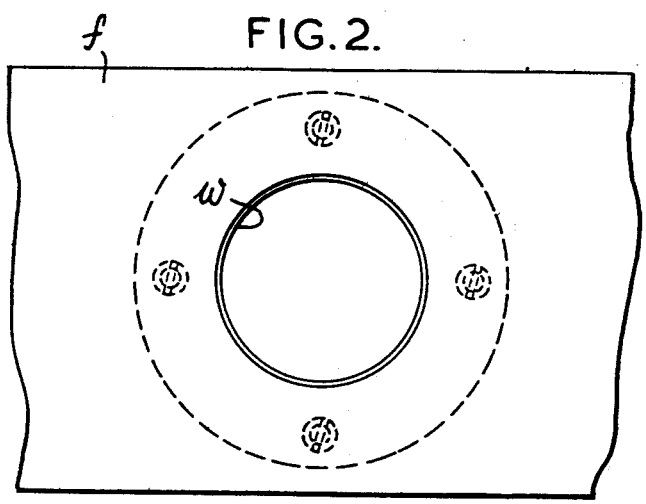
Figure 3:
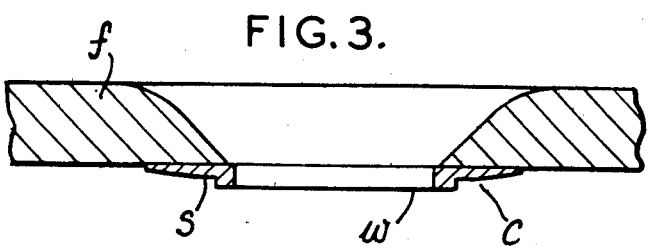
Figure 4:
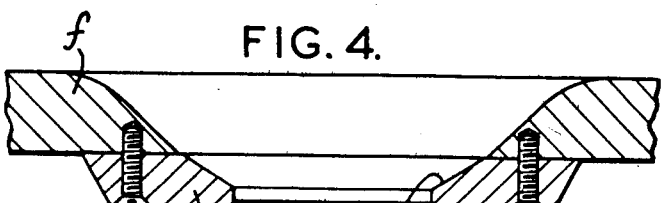

In the drawings,

Figure 1 is a sectional view of an outer pole structure according to one form of the invention, Figure 2 is a front plan of the structure shown in Figure 1, Figure 3 is a view corresponding to Figure 1 of a modified construction according to the invention, and Figure 4 is a similar view of another modification.

In these, Figure 1 is the sectional side view of the simplest possible arrangement, the pole piece being in the form of a flat washer $w$ not necessarily circular, and with hole diameter corresponding to the required gap outer diameter. One flat face of the washer is in contact with the flat face of the front plate $f$. Screws are used to fix the two together and hold them in magnetic contact at the plane between them but any other method of fixing may be used.

Figure 2 is a view of Figure 1 as seen from the front face of the front plate. It will be noted that the hole through the front plate is slightly larger than that through the washer. This permits a bigger tolerance and lower grade workmanship in machining the front plate conical hole.

Figure 3 shows a more elaborate outer pole piece. In this a small step $s$ is machined a short distance from the central hole.

If this step is machined concentric with the gap, it can be used for positioning the outer pole piece in relation to the inner pole by way of a non-magnetic locating piece between them. No fixing means are shown. If the locating piece is fixed to the front plate by screws, these may pass through holes provided in the pole piece, which is then clamped firmly between the front plate and the locating piece. Any other fixing means may be used.

The outer part of the washer away from the front plate $f$ is chamfered for the reason given earlier.

In Figures 1 and 3 the thickness of the washer determines the axial length of the gap. If a thicker washer is desirable the axial length can be made less than the washer thickness by cutting away surplus metal, conveniently by chamfering on one or both sides of the hole.

This is illustrated in Figure 4 where the chamfering is slight on the inner face at $y$ and considerable on the front face at $z$. The outer corner of the pole piece is also chamfered as shown to reduce leakage.

This invention is not restricted to the particular arrangements illustrated, but refers generally to means of avoiding close tolerances and high accuracy workmanship and yet establishing a first class magnetic joint between the outer pole piece and the front plate.

I claim:

1. An outer pole-forming structure for a magnet of the type having inner and outer annular pole faces of opposite polarity facing one another across an annular air-gap, comprising a front magnet plate having a hole therethrough and a separate annular pole piece in the form of a flat plate of greater thickness than the width of the air gap and having a hole therein of smaller diameter than the hole in said plate for forming said outer annular pole-face, at least one side of such pole piece being chamfered round said hole for reducing the thickness of said pole piece adjacent said pole face, said magnet plate extending outwardly from said opening beyond the periphery of said pole-piece and said magnet plate and pole-piece having mutually contacting flat surfaces located in a plane at right angles to the axis of said pole-piece and forming a magnetic joint between said magnet plate and said pole-piece.

2. An outer pole-forming structure as claimed in claim 1, wherein said pole piece has a chamfered outer corner.

PAUL GUSTAVUS ADOLPHUS
  HELMUTH VOIGT.

REFERENCES CITED

The following references are of record in the file of this patent:

UNITED STATES PATENTS

| Number | Name | Date |
|---|---|---|
| 1,721,023 | Jensen | July 16, 1929 |
| 1,859,518 | Kingsford | May 24, 1932 |
| 1,986,856 | Ringel | Jan. 8, 1935 |
| 2,047,361 | Dijksterhuis | July 14, 1936 |
| 2,141,595 | Cornwell | Dec. 27, 1938 |
| 2,161,318 | Sauerland | June 6, 1939 |
| 2,429,470 | Knowles | Oct. 21, 1947 |

FOREIGN PATENTS

| Number | Country | Date |
|---|---|---|
| 378,145 | Great Britain | Aug. 11, 1932 |
| 412,552 | Great Britain | June 21, 1934 |